United States Patent
O'Donnell et al.

[19]

[11] Patent Number: 5,975,467
[45] Date of Patent: Nov. 2, 1999

[54] INFLATABLE EVACUATION SLIDE

[75] Inventors: John W. O'Donnell, Brick; Dean Staudt, Lakewood, both of N.J.

[73] Assignee: Air Cruisers Company, Wall, N.J.

[21] Appl. No.: 09/130,711

[22] Filed: Aug. 6, 1998

[51] Int. Cl.[6] .............. B64C 1/22; A62B 1/20; B65G 11/10
[52] U.S. Cl. .......... 244/137.2; 182/48; 182/49; 193/25 R; 193/25 A; 193/25 B; 193/25 C
[58] Field of Search ............... 244/137.2, 905; 182/48, 49; 193/25 R, 25 A, 25 C, 25 B

[56] References Cited

U.S. PATENT DOCUMENTS

| | | |
|---|---|---|
| 3,463,266 | 8/1969 | Day . |
| 3,860,984 | 1/1975 | Fisher .................................. 193/25 B |
| 3,866,734 | 2/1975 | Elkins et al. . |
| 4,246,980 | 1/1981 | Miller . |
| 4,332,049 | 6/1982 | Fisher . |
| 4,434,870 | 3/1984 | Fisher ....................................... 182/48 |
| 4,519,782 | 5/1985 | Fisher ....................................... 182/48 |
| 4,723,628 | 2/1988 | Fisher ....................................... 182/48 |
| 4,723,929 | 2/1988 | Parish . |
| 4,846,422 | 7/1989 | Fisher .................................. 244/137.2 |
| 5,360,186 | 11/1994 | Danielson et al. ................... 244/137.2 |

*Primary Examiner*—Michael J. Carone
*Assistant Examiner*—Charles R. Ducker, Jr.
*Attorney, Agent, or Firm*—Lawrence G. Fridman

[57] ABSTRACT

An inflatable evacuation slide for an aircraft comprising upper and lower sliding regions interconnected by an intermediate sliding region and including a flexible sliding support surface. An inflatable support structure extends outwardly from the upper sliding region and formed by at least first and second support sections spaced from each other and extending in planes transverse to a plane of the sliding support surface. Each support section comprises an engaging member interposed between a connecting member and a supporting member. The connecting and supporting members are connected to the upper sliding region, so that the engaging members are substantially parallel to each other and spaced from the upper sliding region.

18 Claims, 6 Drawing Sheets

INFLATABLE EVACUATION SLIDE

FILED OF THE INVENTION

The present invention relates in general to inflatable evacuation slides, and more particularly to inflatable evacuation slide systems utilized with large size aircraft.

BACKGROUND OF THE INVENTION

The threat of potential loss of lives or injuries at the time of an emergency landing or interruption of take-off demands swift and reliable removal of passengers from the aircraft. The trend toward larger aircraft with a concomitant increase in passengers makes the reliability of emergency evacuation systems even more critical. Problems typically affecting reliability of inflatable aircraft escape slides, such as lack of stability during use and deployment have become more acute with the advent of super-jumbo aircraft. Such aircraft carry a large number of passengers and include an upper deck passenger area located at a substantial distance from the ground. Evacuation of passengers from super-jumbo aircraft is facilitated by providing localized or individual exits positioned as close to the passenger seating areas as possible. Among examples of such localized emergency evacuation exits are the doors provided at the upper deck level which require special inflatable system capable of reliably evacuating passengers from the levels of high elevation. These systems also require sufficient stability during deployment, a high degree of perceived safety, adequate deceleration means to optimize sliding velocity and multiple lanes to maximize traffic.

Thus, there has been a long felt and unsolved need to equip the upper deck area of a super-jumbo multi deck aircraft with a multiple lane inflatable aircraft evacuation slide-raft for use during evacuation of passengers therefrom, having enhanced stability and safety during deployment and operation.

The overwater flights regulations require a carrier to provide not only emergency evacuation slides, but also life rafts in sufficient quantities to accommodate all passengers and crew members. This requirement is especially important for super-jumbo jets commonly used for transcontinental flights. Thus, since the present state of the art requires that aircraft are provided with inflatable evacuation slide devices and inflatable life rafts, there has been a need for an inflatable evacuation slide serving the upper deck areas of super-jumbo jets; to be utilizable for ground and overwater evacuation of passengers and, in the latter case, adapted for use as inflatable life rafts.

SUMMARY OF THE INVENTION

One aspect of the present invention provides an inflatable evacuation slide consisting of an upper sliding region and a lower sliding region interconnected by an intermediate sliding region. Each sliding region has top and bottom portions. A flexible sliding support surface extends along the upper, intermediate and lower sliding regions. An inflatable support structure extends outwardly from the bottom portion of the upper sliding region and consists of at least first and second support sections. Such sections are spaced and extend in planes substantially parallel to each other and transverse to a plane of sliding support surface extending through the upper sliding region. Each support section consists of an engaging member interposed between a connecting member and a supporting member. The connecting and supporting members of the first and second support sections are connected to the bottom portion of the upper sliding region in such a manner that the engaging member is spaced from the upper sliding region, so as to form an open area between the connecting, engaging and supporting members as well as the bottom portion of the upper sliding region.

A further aspect of the invention provides the inflatable evacuation slide in which each support section further comprises an auxiliary member situated at an angle to the supporting member and between the supporting member and the upper sliding region. The first and second support sections are joined by at least one connecting element.

A still further aspect of the invention provides the inflatable evacuation slide in which the bottom portion of the upper sliding region is a tube structure including at least two longitudinal side tubes, so that the connecting and supporting members of the first and second support sections are connected to the longitudinal side tubes of the tube structure. Upon deployment of the inflatable evacuation slide, the engaging members of the first and second support sections are adapted for engagement with a portion of a fuselage of a super-jumbo aircraft between an upper deck level and a lower deck level in such a manner that a rigid interface is formed between the inflatable support structure, the upper sliding region and the portion of the fuselage, so as to support at least the upper sliding region in an inclined position and the intermediate sliding region in a substantially horizontal position.

A still another aspect of the invention provides an inflatable evacuation slide for an aircraft having at least an upper deck and a lower deck and a portion of a fuselage extending between levels of the upper and main decks. The evacuation slide includes an upper sliding region and a lower sliding region interconnected by an intermediate sliding region. Each sliding region has top and bottom portions. A flexible sliding support surface extends along the top portions of the upper, intermediate and lower sliding regions. An inflatable support structure extends outwardly from the bottom portion of the upper sliding region and consists of at least first and second support sections. The sections are spaced and extend in planes substantially parallel to each other and transverse to a plane of the sliding support surface. Each support section consists of an engaging member interposed between the connecting member and a supporting member. The connecting and supporting members of the first and second support sections are connected to the bottom portion of the upper sliding region in such a manner that the engaging member is spaced from the upper sliding region. To provide support for at least the upper sliding region in an inclined position and the intermediate sliding region in a horizontal position, the engaging members of the first and second support sections engage the portion of the fuselage of the aircraft between the upper deck sill and the lower deck sill.

BRIEF DESCRIPTION OF THE DRAWINGS

Other advantages and features of the invention are described with reference to exemplary embodiments, which are intended to explain and not limit the invention and are illustrated in the drawings in which.

DETAILED DESCRIPTION OF THE PREFERRED EMBODIMENT

Figure 1:
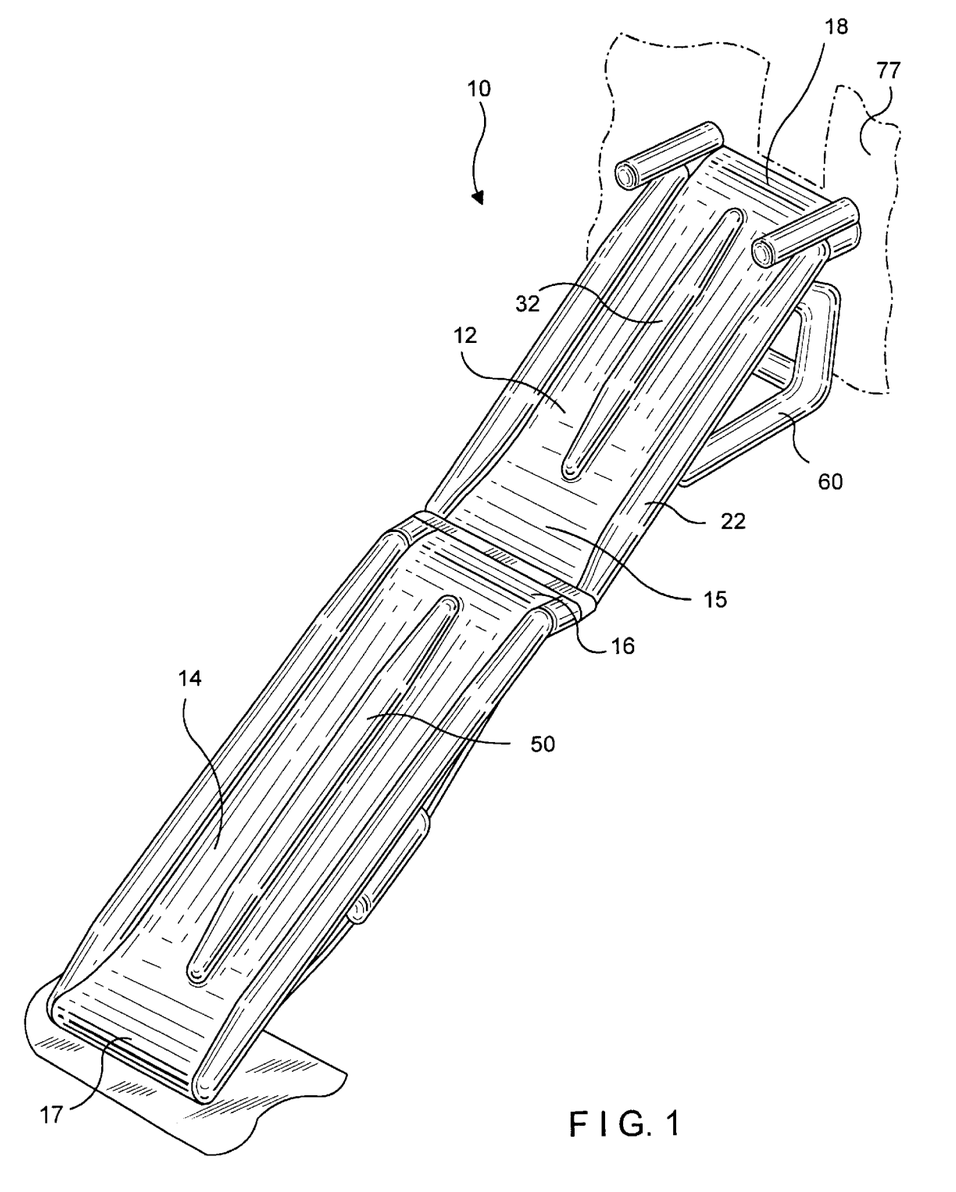
FIG. 1 is a front perspective view of the inflatable evacuation slide of the invention.
Figure 2:
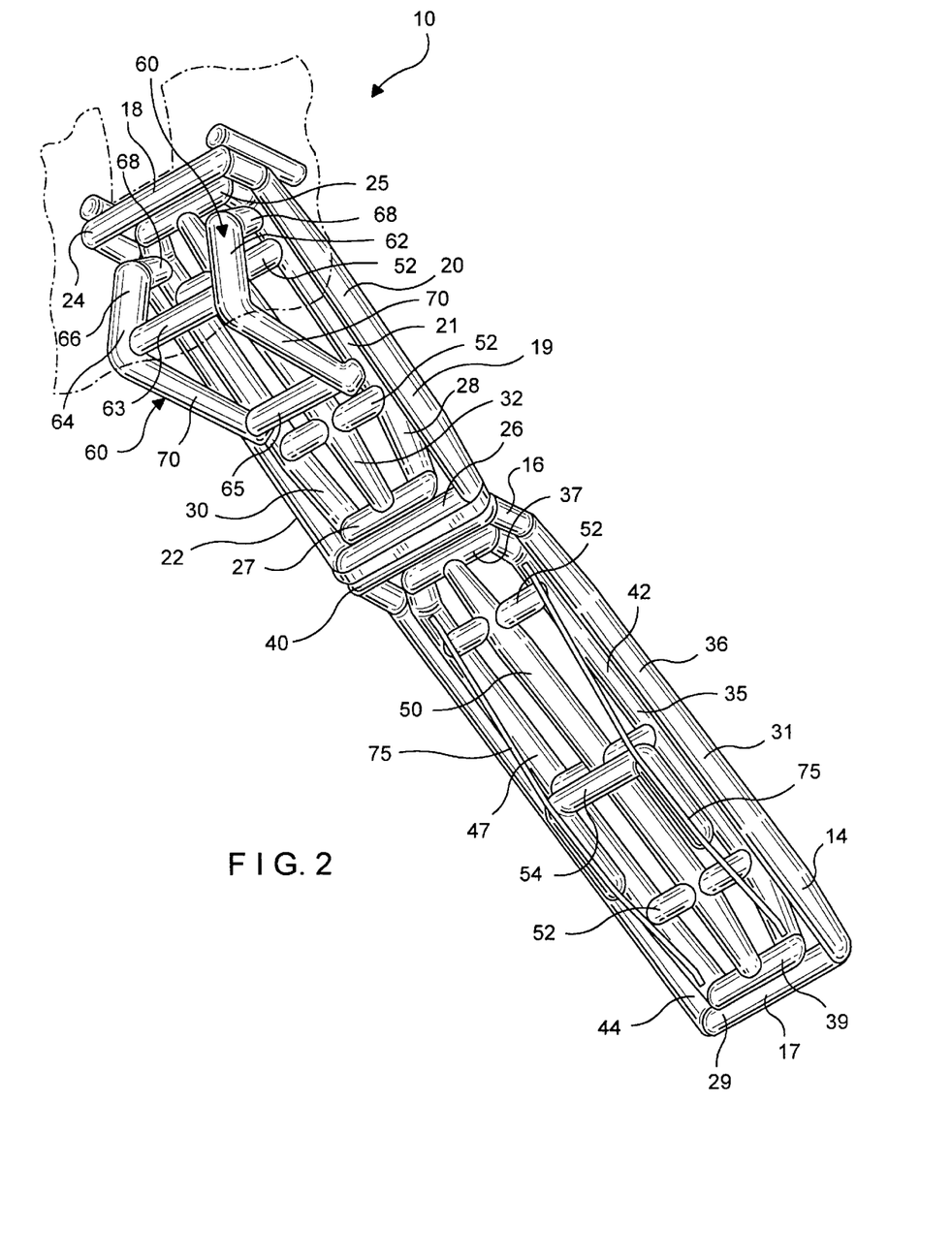
FIG. 2 is a rear perspective view thereof.
Figure 3:
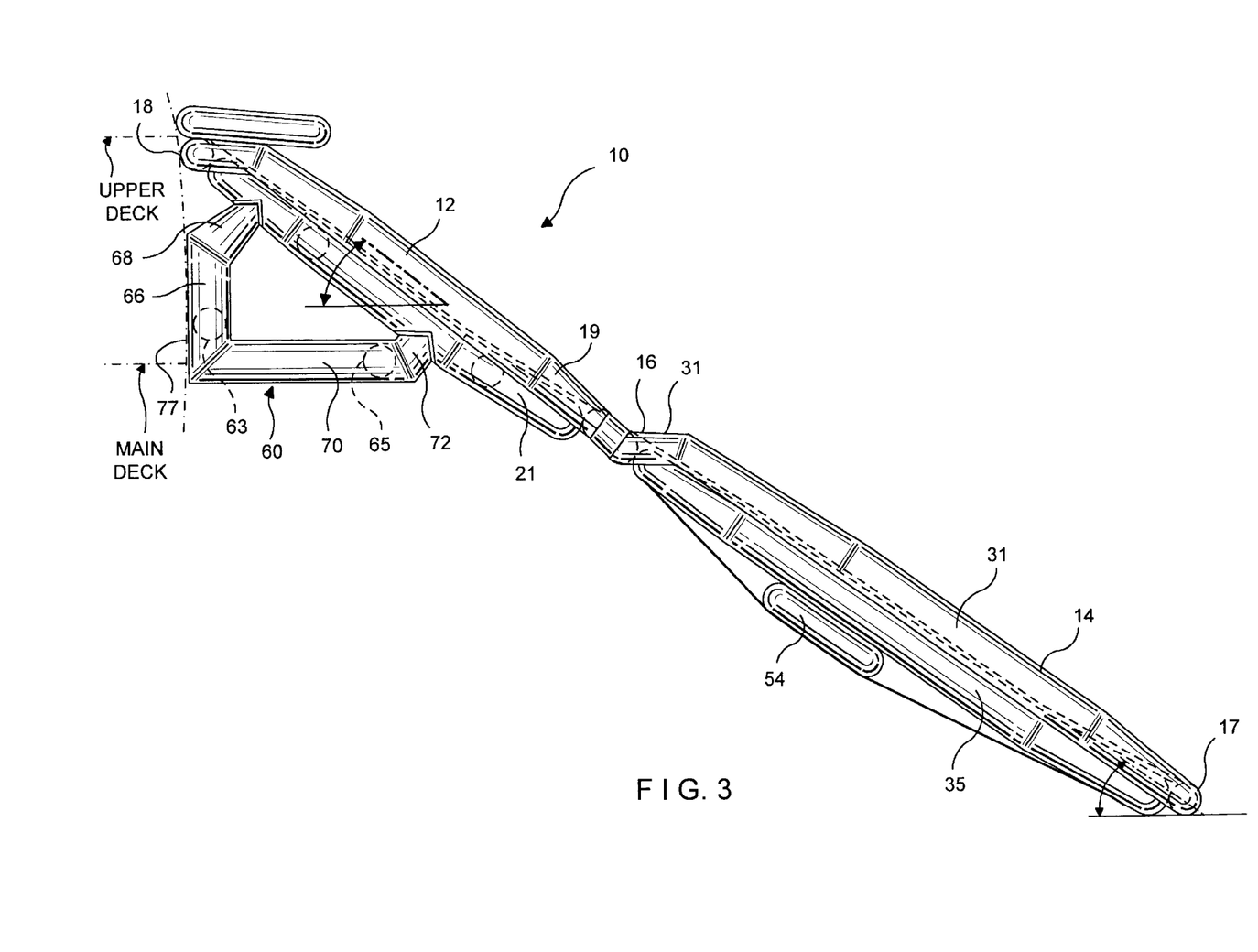
FIG. 3 is a slide elevational view thereof.
Figures 4, 5:
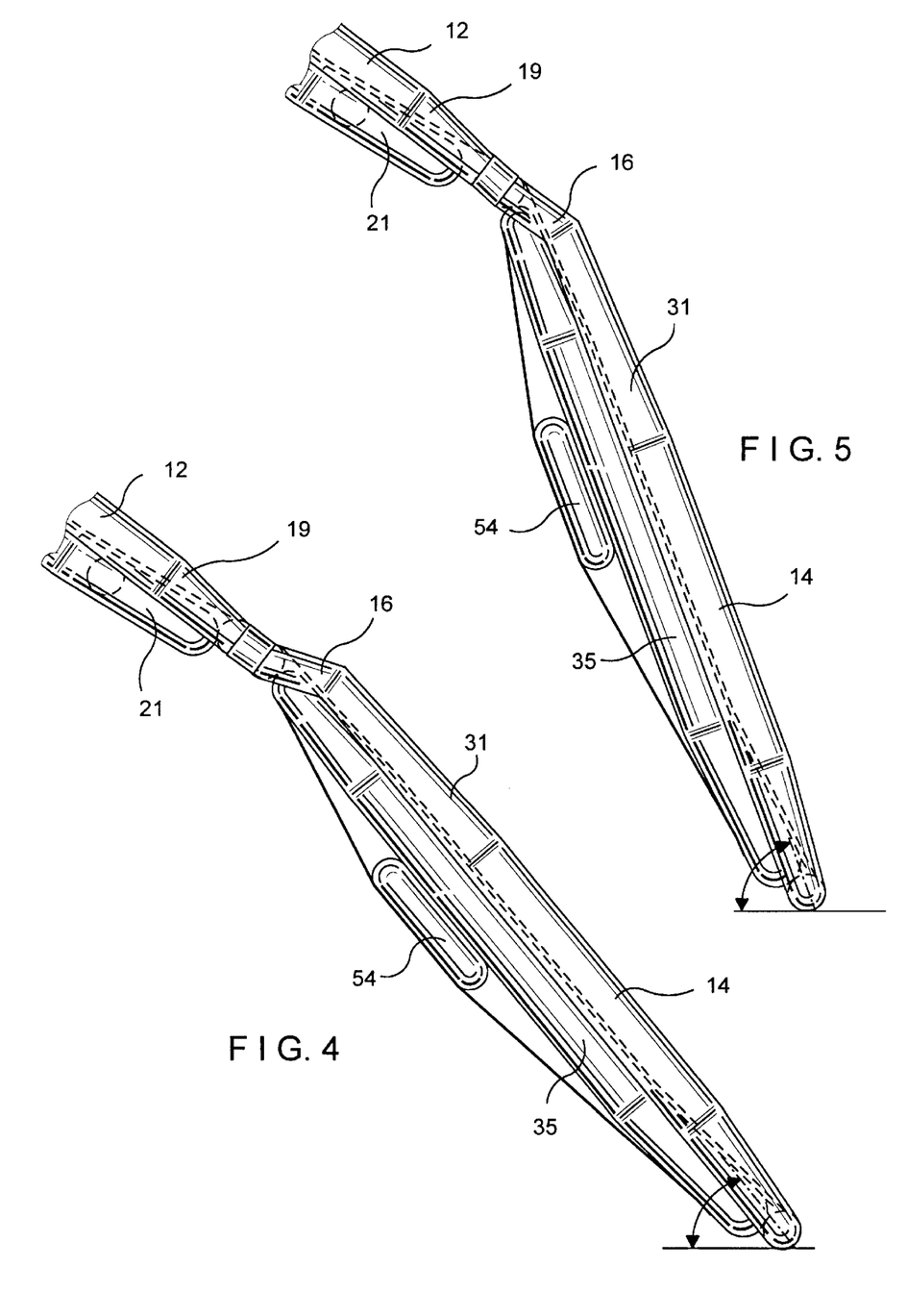
FIG. 4 is a partial side elevational view showing one position of the evacuation slide.
FIG. 5 is a partial side elevational view showing another position of the evacuation slide.

Referring now to FIGS. 1–3, wherein the emergency evacuation slide 10 of the present invention adapted for use with super-jumbo aircraft having upper and lower decks is best illustrated. The slide extends between a sill end 18 and a lower or runway end 17 and consists of an intermediate sliding region 16 medial between an upper sliding region 12 and a lower sliding region 14. The sliding regions are formed by corresponding top and bottom tube structures positioned one over the other and suitably secured or bonded together. In this respect, a top tube structure 19 of the upper sliding region 12 is formed by first and second longitudinal side tubes 20 and 22, respectively, interconnected at the end portions thereof by a laterally extended upper tube 24 and a first middle tube 26. A bottom tube structure 21 of the upper sliding region includes two longitudinal side tubes 28, 30 joined at the respective ends by cross tubes 25, 27. A centrally positioned divider tube 32 extends longitudinally within the bottom tube structure.

Although the intermediate sliding region 16 and the lower sliding region 14 can be developed as independent inflatable formations, in the preferred embodiment of the invention these regions are combined forming a lower unitary top tube structure 31. The top tube structure similar to the above discussed upper region, consists of two longitudinal side tubes 36, 44 interconnected by a second middle tube 40 and a runway tube 29. A corresponding unitary bottom tube structure 35 which also supports the intermediate and lower sliding regions comprises of two longitudinal side tubes 42, 47; cross tubes 37, 39 as well as a centrally situated divider tube 50. In the bottom tube structures, lateral tubes 52 span an area between the longitudinal side tubes and the divider tube along the length of the corresponding unit. This enhances structural stability of the inflatable as the passenger progresses through the upper 12 and lower 14 sliding regions. As illustrated in FIG. 2, the unitary bottom tube structure 35 supporting the lower and intermediate regions is formed with three sets of the lateral tubes 52. In a similar fashion, the bottom tube structure 21 of the upper sliding region 12 contains two sets of the lateral tubes 52. The lateral tubes enable the invention to prevent the body of the inflatable from twisting or rolling out. This also prevents evacuation sliding lanes formed by the divider tubes 32,50 from being converted into a single trough which would adversely affect the rate of passenger evacuation.

As illustrated in FIG. 1, the sliding surface or floor 15, is developed as a flexible, continuous taut membrane to provide a simple and effective evacuation pass to the passengers. The floor 15 is constructed for smooth passage of passengers from one sliding region to another. Thus, it transitions from the top of the upper sliding region, longitudinally to the intermediate and lower sliding regions, and then to the top of the runway or lower end tube, so as not to encumber the sliding progress of evacuees. This floor structure provides optimum performance during evacuation without collapsing. As best illustrated in FIGS. 1 and 3–6, in the invention, airholding surfaces of the inflatable structure which can be contacted by evacuee's footwear are protected by the sliding surface fabric 15 having high puncture and abrasion resistance. This arrangement substantially reduces the possibility of sharp objects penetrating through the body of the inflatable, and preventing rupturing of the tubes.

The sliding surface 15 can be disposed slightly below the upper surface of the side longitudinal tubes, so that the tubes provide lateral restraining. In addition, this enables the longitudinal side tubes to twist slightly under the load causing the fabric to yield and increase frictional deceleration.

In the lower sliding region 14 further beam strength is obtained by means of installation of a U-shaped truss tube 54 located centrally of the sliding surface underneath the unitary bottom tube structure 35. The truss tube is arched upwardly under the divider tube 50.

As best illustrated in FIGS. 2 and 3, an inflatable support structure 60 is associated with the upper sliding region 12. The support structure consists of a first support section 62 and a second support section 64 joined by at least two connecting elements 63, 65. Both support sections 62 and 64 are of substantially similar design and extend in planes substantially parallel to each other and transverse to a plane of the upper sliding region. Each support section is formed by an engaging member 66 interposed between a connecting member 68 and a supporting member 70. An angled short auxiliary member 72 is typically provided between the supporting member 70 and the structure of the upper sliding region. In each support section the connecting member 68 and the supporting member 70, by means of the auxiliary member 72, are connected to the upper sliding region 12 in general and specifically connected to the corresponding longitudinal side tubes 28, 30 of the bottom tube structure 21. The connecting element 63 extends between the engaging members 66, whereas the connecting element 65 interconnects the supporting members 70 of the sections 62 and 64 in the vicinity of the upper sliding region.

In the inflated condition of the invention, each support section is disposed in such a manner that the engaging member 68 is situated substantially vertically, so as to form a generally right angle with the supporting member 66. In this arrangement each engaging member 66 is spaced from the upper sliding region 12 and firmly retained in its substantially vertical position by the corresponding connecting/supporting members. In this manner, the inflatable support structure 60 consisting of two support sections 62,64 joined by the connecting elements 63, 65 represents a substantially rigid formation positioned under the upper sliding region 12.

The connecting elements 63,65 connecting the engaging member 66 and the supporting member 70, respectively, of the first and second support sections may be of relatively small diameter. This is because their primary function is not one of load bearing but merely to maintain the spaced, substantially parallel relationship of the support sections 62 and 64. Although in the preferred embodiment of the invention, the inflatable support structure 60 is shown to have two connecting elements 63,65; it is understood that providing any reasonable number of such elements distributed throughout the periphery of the support structure is within the scope of the invention.

Upon deployment of the inflatable evacuation slide of the invention,(see FIG. 3 for example) the engaging members 66 of the first and second support section extend substantially vertically. Such position enables the engaging members to engage a large oval-shaped exterior portion 77 of the fuselage available substantially between an upper deck sill and a lower deck sill of a super-jumbo aircraft. Thus, a rigid interface is formed between the upper sliding region 12 of the inflatable evacuation slide and the oval-shaped exterior part 77 of the fuselage of the super-jumbo upper deck installation. In this arrangement, outer parts of the engaging members 66 of the first and second support sections bear firmly against the fuselage of the aircraft to provide operational support not only for the upper sliding region 12 but for the entire evacuation slide, so as to ensure a stable escape route for evacuees.

As illustrated in at least FIGS. 1–3, in the inflated condition of the invention, the upper sliding region 12 is angled from the area of the upper deck sill to the area of the lower deck sill. At this point, the sliding surface is constructed to provide a smooth transition into the intermediate substantially horizontal region 16 of a predetermined length. The support structure 60 is strategically positioned to extend essentially through the central part of the upper sliding region 12 with the supporting members 70 shifted toward the lower end thereof. In view of sufficient beam strength developed in this area of the inflatable by the rigid interface and by means of utilization of the large bearing surface 77 available on the fuselage under the upper deck sill, the invention provides support for the upper sliding region 12 and also maintains the intermediate region 16 in a substantially horizontal position. This arrangement facilitates supporting the lower sliding region 14 in a desired inclined position and provides an approachable sliding plane regardless of aircraft sill height conditions.

Tension bands 75 are installed under each longitudinal tube 42, 44 of the unitary bottom tube structure 35, so as to span over the truss tube 54, thereby pre-stressing the inflatable structure and preventing the sagging thereof in the middle of the lower sliding region. Provision of the tube 54 under the bottom tube structure 35 in combination with the tension bands 75, enhances the beam strength of the inflatable.

As illustrated in at least FIGS. 1–3, the inflatable of the invention can be formed as a continuous structure constructed to provide a smooth transition of the upper sliding region into the intermediate and lower sliding regions. In this embodiment, the flexible sliding surface of the floor 15 of the inflatable uninterruptedly extends between the sill end 18 and the runway end 17.

Figure 7:
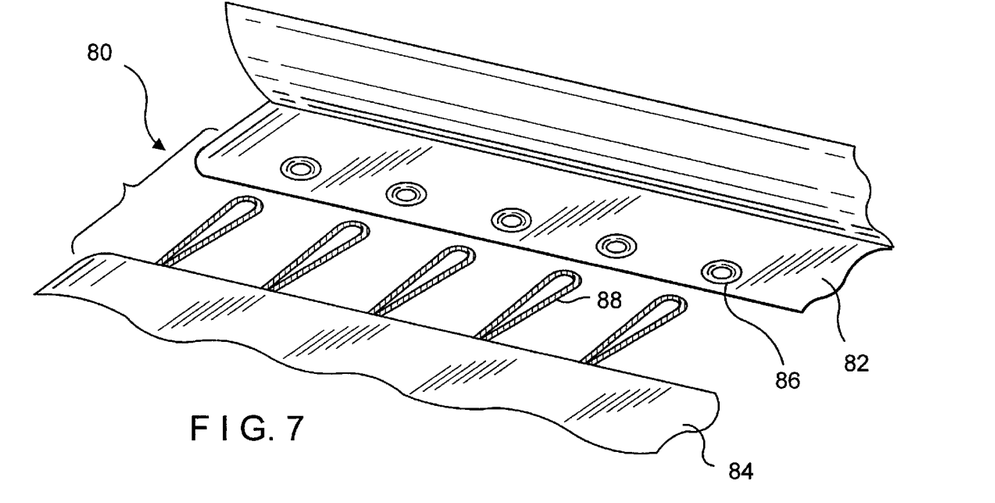
FIG. 7 illustrates connecting strips of a releasable connecting arrangement.

In another embodiment of the invention, (see FIGS. 7–9) a releasable connecting arrangement 80 is provided between the upper sliding region 12 and the unitary inflatable structure combining the intermediate 16 and lower 14 sliding regions.

Figures 8, 9:
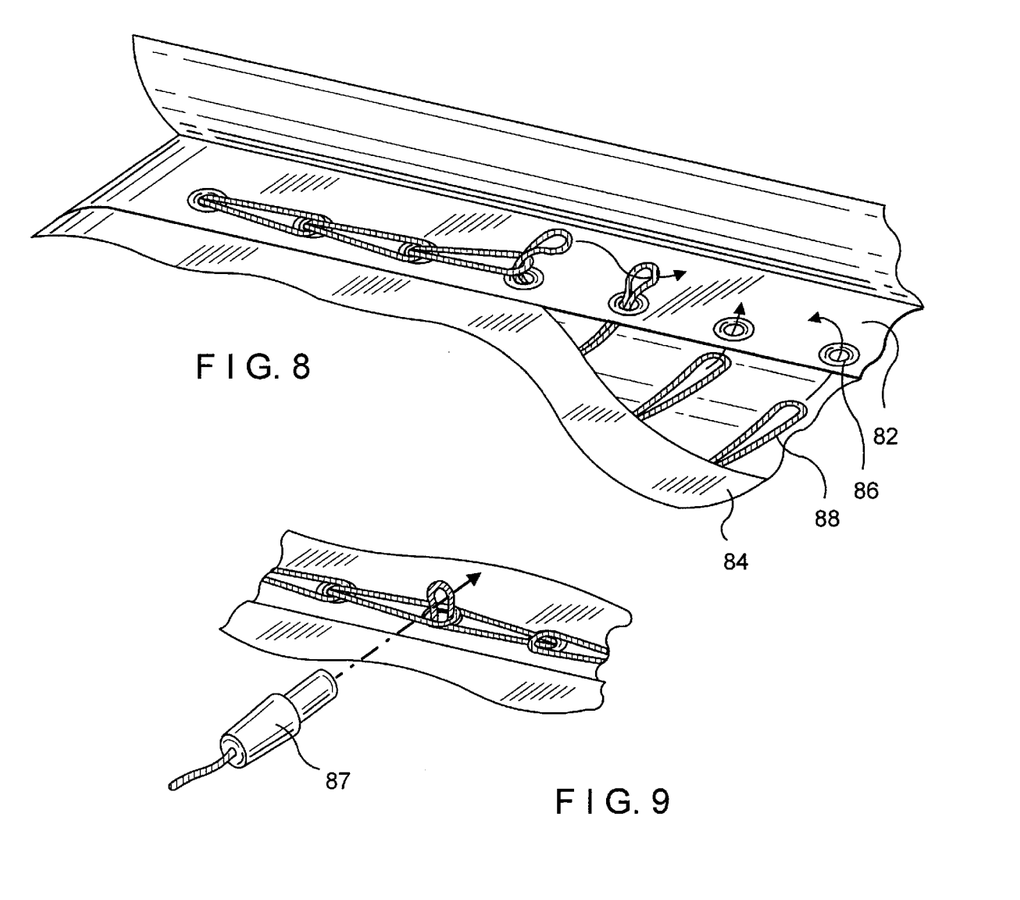
FIG. 8 illustrates the strips of the releasable connecting arrangement in a partially assembled condition.
FIG. 9 illustrates a detail of the releasable connecting arrangement.

The releasable connecting arrangement 80 which surrounds the outer periphery of the inflatable comprises a first connecting strip 82 associated with the lower end of the top tube structure 19 and a second connecting strip 84 extending from the unitary top tube structure 31. A multiplicity of openings 86, which can be formed with grommets, are positioned at an outer edge of the first connecting strip 82. The second connecting strip 84 contains a plurality of flexible loops 88 suitably fastened to an outer edge thereof. As illustrated in FIG. 8, each loop is long enough to pass through the corresponding opening and to extend from one opening to the next. As the first connecting strip 82 is positioned over the second connecting strip 84, the loops 88 are passed through the adjacent openings 86. One outboard loop is then threaded over the adjacent loop, which is then threaded over the loop adjacent to it. Working inwardly from one side to the other side, when the final loop is reached, a suitable pin 87 (see FIG. 9) may be passed therethrough to lock all the loops together, so as to firmly fasten strips and the sliding regions. When the pin 87 is pulled from the final loop it releases the loops from mutual engagement causing separation of the strips and sliding regions. When the evacuation slide of the invention is deflated and there is no load of compression acting between the tubes, it is easy to connect or lace both strips together. However, when the tubes are inflated causing the internal pressure in the tubes to act against one another, the connecting releasable arrangement 80 is placed under tension. Therefore, when the pin 87 is pulled out of the final loop, the compression of the adjacent tubes causes the connecting arrangement to separate. Although, a specific releasable attaching means has been described hereinabove, it represents one of many releasable arrangements which can be employed by the present invention for joining and separating of the sliding regions.

Figure 6:
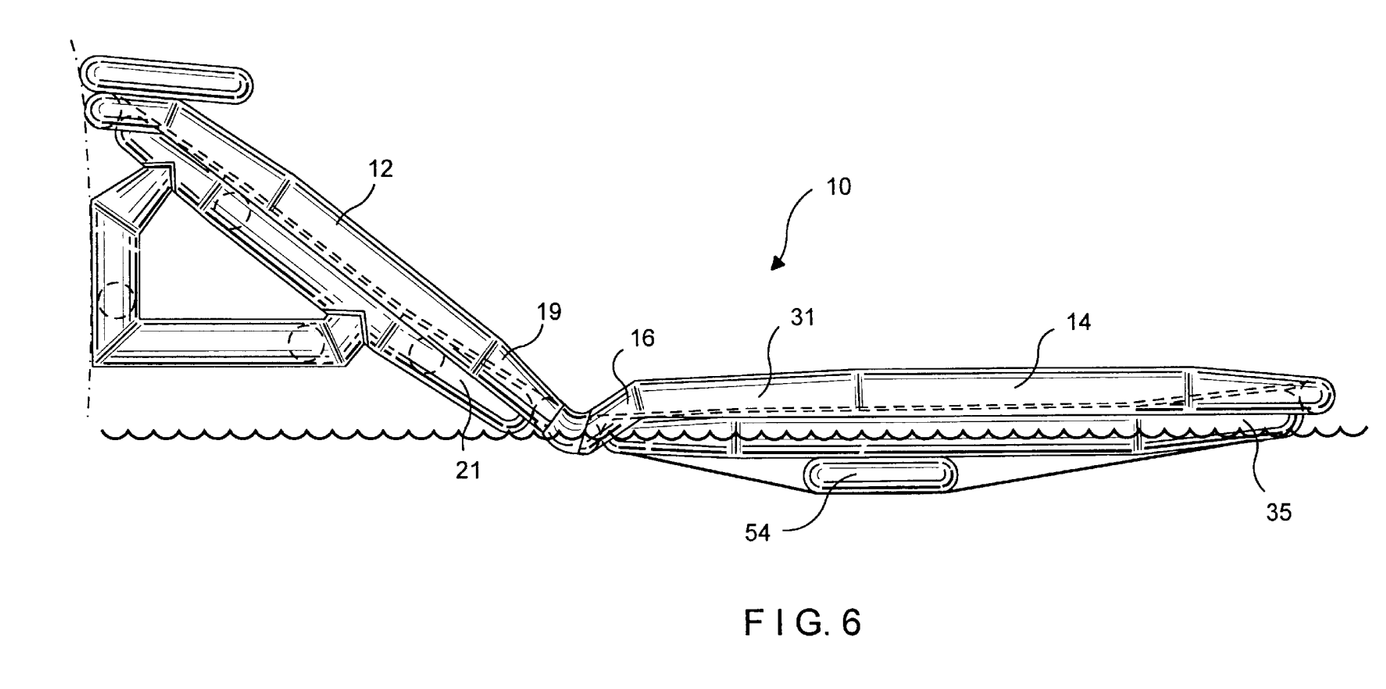
FIG. 6 illustrates use of the evacuation slide of the invention as a life raft.

In the case of water evacuation, the inflatable structure of the invention operates as a life raft. In this application, as illustrated in FIG. 6, the upper sliding region 12 serves as the boarding slide positioned at a suitable angle to the horizontal. The intermediate and lower sliding regions are adapted to receive the evacuees. Upon completion of the boarding process, the intermediate and lower sliding regions 14, 16 serving as a raft are disconnected from the upper region in the above described manner, by pulling the pin which frees the loops from mutual engagement and causing the regions to separate.

The inflatable structure of the invention is preferably fabricated from an air-impervious material such as urethane or other suitable elastomer which can be coated on a light-weight fabric. A suitable adhesive can be used for joining various parts of the slide. Thus, the assembled evacuation slide forms a unitary composite structure capable of precluding airflow from the chamber during inflation and operation in the inflated state. The structure of the inflatable can be formed as a single internally pneumatic slide assembly capable of receiving an inflating fluid from a compressed pressurized source utilized for the deployment thereof.

During evacuation of passengers from the upper deck area of the super-jumbo aircraft, upon deployment of the evacuation slide of the invention, initially, the evacuees are transported by means of the angled upper sliding region 12 from the level of upper deck sill to the level of the lower deck sill. At this level, the intermediate, substantially horizontal region 16 is positioned. Upon deceleration at the intermediate horizontal region, the evacuees by means of the angled lower sliding region 14, continue their sliding egress to the runway end of the inflatable. In this arrangement stability and proper orientation of sliding regions are enhanced by the inflatable support structure 60 which is adapted to engage the large bearing surface available on the fuselage of the super-jumbo aircraft between the upper and the lower deck sills. In view of provision of the intermediate substantially horizontal region interposed between the upper and lower sliding regions, the inflatable evacuation slide of the invention provides an integral transition which visibly alters the view of evacuee. Such transition presents to evacuees a more appealing route compared to viewing a single extended plane having a long and uninterrupted sloping surface. By segmenting the egress path into three separate regions, important psychological factors influencing evacuees are addressed. The substantially horizontal intermediate region provides both a nearer point of focus than the distant ground and a natural interim area of deceleration.

What is claimed is:

1. An inflatable evacuation slide for an aircraft, comprising:

an upper sliding region and a lower sliding region interconnected by an intermediate sliding region, each said sliding region having top and bottom portions, a flexible sliding support surface extending along said top portions of said upper, intermediate and lower sliding regions;

an inflatable support structure extending outwardly from said bottom portion of said upper sliding region, said inflatable support structure comprising at least first and second support sections, said first and second support sections being spaced from each other and extending in planes transverse to a plane of said flexible sliding support surface extending through said upper sliding region, each said support section consisting of an engaging member interposed between a connecting member and a supporting member, said connecting and supporting members of said first and second support sections being connected to said bottom portion of the upper sliding region in such a manner that said engaging members being substantially parallel to each other and spaced from said upper sliding region.

2. The inflatable evacuation slide of claim 1, wherein each said support section further comprises an auxiliary member situated at an angle to said supporting member and between said supporting member and said bottom portion of the upper sliding region.

3. The inflatable evacuation slide of claim 1, wherein said first and second support sections are joined by at least one connecting element, and said first and second support sections extend in planes substantially parallel to each other.

4. The inflatable evacuation slide of claim 3, wherein said first and second support sections are joined by first and second connecting elements, so that said first connecting element interconnects said engaging members and said second connecting element interconnects said supporting members of said support sections; and an open space is defined in each support section surrounded by said engaging, supporting and connecting members and said bottom portion of the upper sliding region.

5. The inflatable evacuation slide of claim 4, wherein said bottom portion of the upper supporting region is a tube structure including at least two longitudinal side tubes, so that said connecting and supporting members of said first and second support sections are connected to said longitudinal side tubes of the bottom tube structure.

6. The inflatable evacuation slide of claim 1, wherein upon deployment of said evacuation slide said engaging members of said first and second support sections are positioned substantially vertically.

7. The inflatable evacuation slide of claim,6, wherein said supporting members are positioned at a substantially right angle to said engaging members.

8. The inflatable evacuation slide of claim 7, wherein said engaging members of the first and second support sections are adapted for engagement with a portion of a fuselage of a super-jumbo aircraft between an upper deck sill and a lower deck sill in such a manner that a rigid interface is formed between said upper sliding region and said portion of the fuselage, so as to support at least said upper sliding region in an inclined position and said intermediate sliding region in a substantially horizontal position.

9. The inflatable evacuation slide of claim 1, wherein a releasable connecting arrangement is provided between said upper sliding region and said intermediate sliding region, so as to separate said regions when said evacuation slide is used as a life raft.

10. An inflatable evacuation slide for an aircraft having at least an upper deck and a lower deck and a portion of a fuselage extending between the upper and lower decks, said inflatable evacuation slide comprising:

an upper sliding region and a lower sliding region interconnected by an intermediate sliding region, each said sliding region having top and bottom portions, a flexible sliding support surface extending along said top portions of said upper, intermediate and lower sliding regions;

an inflatable support structure extending outwardly from said bottom portion of said upper sliding region, said inflatable support structure comprising at least first and second support sections, said first and second support sections being spaced from each other and extending in planes transverse to a plane of said flexible sliding support surface extending through said upper sliding region, each said support section consisting of an engaging member interposed between a connecting member and a supporting member, said connecting and supporting members of said first and second support sections being connected to said bottom portion of the upper sliding region in such a manner that said engaging members being spaced from said upper sliding region, whereby said engaging members of said first and second support sections engage a portion of a fuselage of aircraft between an upper deck and a lower deck, so that said inflatable support structure provides support for at least said upper sliding region in an inclined position and for said intermediate sliding region in a substantially horizontal position.

11. The inflatable evacuation slide of claim 10, wherein each said support section further comprises an auxiliary member situated at an angle to said supporting member and between said supporting member and said bottom portion of the upper sliding region.

12. The inflatable evacuation slide of claim 10, wherein said first and second support sections are joined by at least one connecting element, and said first and second support sections extend in planes substantially parallel to each other.

13. The inflatable evacuation slide of claim 12, wherein said first and second support sections are joined by first and second connecting elements, so that said first connecting element interconnects said engaging members and said second connecting element interconnects said supporting members of said support sections; and an open space area is defined in each support section surrounded by said connecting, engaging and supporting members and the bottom portion of the upper sliding region.

14. The inflatable slide of claim 10, wherein said bottom portion of the upper sliding region is a tube structure including at least two longitudinal side tubes, so that said connecting and supporting members of said first and second support sections are connected to said longitudinal side tubes of the bottom tube structure.

15. The inflatable evacuation slide of claim 10, wherein upon deployment of said evacuation slide said engaging members of said first and second support sections are positioned substantially vertically.

16. The inflatable evacuation slide of claim 15, wherein said supporting members are positioned at a substantially right angle to said engaging members.

17. The inflatable evacuation slide of claim 16, wherein a rigid interface is formed between said inflatable support structure, said upper sliding region and said portion of the fuselage between said upper and lower decks.

18. The inflatable evacuation slide of claim 10, wherein a releasable connecting arrangement is provided between said upper sliding region and said intermediate sliding region, so as to separate said regions when said evacuation slide is used as a life raft.

* * * * *